United States Patent [19]

Belde et al.

[11] Patent Number: 5,296,531
[45] Date of Patent: Mar. 22, 1994

[54] PIGMENT PREPARATIONS

[75] Inventors: Horst Belde; Manfred Herrmann; Franz Leppmeier, all of Ludwigshafen; Dietrich Lach, Friedelsheim, all of Fed. Rep. of Germany

[73] Assignee: BASF Aktiengesellschaft, Ludwigshafen, Fed. Rep. of Germany

[21] Appl. No.: 980,189

[22] Filed: Nov. 23, 1992

[30] Foreign Application Priority Data

Dec. 20, 1991 [DE] Fed. Rep. of Germany ....... 4142240

[51] Int. Cl.$^5$ ............................................. C08L 39/06
[52] U.S. Cl. ................... 524/556; 524/819; 524/822; 524/823; 524/824
[58] Field of Search ............... 524/556, 819, 822, 823, 524/824

[56] References Cited

U.S. PATENT DOCUMENTS

| 3,865,772 | 2/1975 | Hulyalkar | 524/822 |
| 3,980,602 | 9/1976 | Jakubauskas | 524/561 |
| 4,278,583 | 5/1981 | Sekiya | 524/555 |
| 4,293,475 | 10/1981 | Sidi | 524/558 |
| 4,510,302 | 4/1985 | Kolb et al. | 524/548 |
| 4,687,789 | 8/1987 | Gannet et al. | 524/560 |
| 4,851,460 | 7/1989 | Stranghoner et al. | 523/416 |
| 5,122,568 | 6/1992 | dePierne et al. | 524/819 |

FOREIGN PATENT DOCUMENTS

| 86354 | 8/1983 | European Pat. Off. |
| 100444 | 2/1984 | European Pat. Off. |
| 0156971 | 10/1985 | European Pat. Off. |
| 2841540 | 4/1980 | Fed. Rep. of Germany |
| 3022542 | 12/1990 | Fed. Rep. of Germany |

OTHER PUBLICATIONS

Das Leder, vol. 37, No. 1, Jan. 1986, SU-992 581.
Chemical Abstracts, vol. 106, No. Apr. 16, 1987, AN 121478c, K. Kano, et al., "Pigment Compositions for Waterborne Inks and Coatings".

Primary Examiner—Paul R. Michl
Assistant Examiner—Edward Cain
Attorney, Agent, or Firm—Oblon, Spivak, McClelland, Maier & Neustadt

[57] ABSTRACT

Pigment preparations useful for pigmenting or delustering finishes for leather and leather substitutes consist essentially of pigments or delusterants or a mixture thereof, binders, water and if desired further customary dispersants and auxiliaries, the binders used being copolymers of A) from 40 to 80% by weight of at least one aromatic vinyl compound of the general formula I

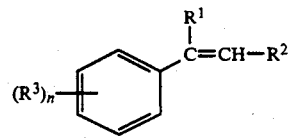

where $R^1$, $R^2$ and $R^3$ are each hydrogen, methyl or ethyl and n is 1 or 2, B) from 20 to 60% by weight of acrylic acid or methacrylic acid or a mixture thereof, and C) from 0 to 10% by weight of further copolymerizable monomers, in the form of their salts.

15 Claims, No Drawings

PIGMENT PREPARATIONS

The present invention concerns pigment preparations consisting essentially of pigments or delusterants or a mixture thereof, binders, water and, if desired, further customary dispersants and auxiliaries and their use for pigmenting or delustering finishes for leather and leather substitutes. The invention further concerns a process for preparing leather and leather substitutes by treatment with these finishes.

The properties of finished leather and leather substitutes depend to a particular degree on the finishes used. They in turn are greatly influenced by the mixedin pigment preparations for aqueous systems. The pigment itself affects for example the light and migration fastness and also the hiding power. On the other hand, the substances used for dispersing the pigments and for stabilizing the pigment preparations can affect fastness properties such as wet and dry crock fastness properties, the wet adhesion, the platability, the waterproofness of waterproofed leather and also in particular the sensory properties such as appearance and hand.

As film-forming binders for such pigment preparations, the main functions of which must be considered to be the dispersing effect and the protective colloid properties, it is known to use in particular casein, copolymers of styrene and maleic acid and also vinylpyrrolidone-containing polymers. For instance, EP-B-086 345 (1) describes polymers of acrylic esters, methacrylic esters, N-vinylpyrrolidone, acrylic acid and vinyl esters as binders for pigment preparations; these polymers are prepared by polymerization in water-miscible organic solvents.

Such binders, however have in many cases a number of disadvantages. For instance, it is frequently impossible to prepare stable concentrates of the pigments, since stable pigment preparations generally require high binder levels and the binders mentioned, if used in high amounts, frequently cause viscosity problems. Moreover, the binders frequently have a harshening effect on the layer of finish on the treated leather. It is possible for the fastness properties of the leather to be adversely affected. Frequently the appearance and hand of the leather are impaired. If binders are used that have been prepared, like the polymers described in (1), in organic solvents and been incorporated with these solvents in the finish, the finished leather usually remains too soft for a prolonged period and exhibits poor wet crock fastness and swelling resistance. Moreover, the use of organic solvents is also undesirable from the environmental compatibility aspect.

It is an object of the present invention to eliminate the disadvantages of the prior art by providing improved binders for pigment preparations for leather finishing purposes, in particular preparations which shall be free of organic solvents.

We have found that this object is achieved by pigment preparations consisting essentially of pigments or delusterants or a mixture thereof, binders, water and, if desired, further customary dispersants and auxiliaries, the binders comprising copolymers of
A) from 40 to 80% by weight of at least one aromatic vinyl compound of the general formula I

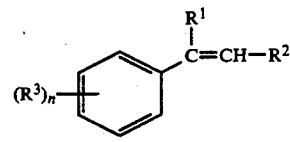

where $R^1$, $R^2$ and $R^3$ are each hydrogen, methyl or ethyl and n is 1 or 2,
B) from 20 to 60% by weight of acrylic acid or methacrylic acid or a mixture thereof, and
C) from 0 to 10% by weight of further copolymerizable monomers,
in the form of their salts.

These pigment preparations can be used with very good results for pigmenting or delustering finishes for leather and leather substitutes.

$R^1$ is preferably hydrogen or methyl, $R^2$ and $R^3$ are each preferably hydrogen, and n is preferably 1. The combination of n=1 and $R^3$=methyl or ethyl results in ortho-, meta- or preferably para-substitution on the phenyl ring. When n is 2 and $R^3$ is methyl or ethyl, the substitution pattern on the phenyl nucleus is preferably 2,4.

A suitable aromatic vinyl compound I for use as component A is in particular styrene or α-methylstyrene or a mixture thereof.

Component B is preferably acrylic acid.

Preferably, component A is used in an amount of from 55 to 65% by weight and component B in an amount of from 35 to 45% by weight. Very particular preference is given to a copolymer composed of about 60% by weight of component A and about 40% by weight of component B.

As further copolymerizable monomers C the copolymers of A and B may for minor modification contain up to 10% by weight, preferably up to 5% by weight, in particular up to 2% by weight, of, for example, acrylic or methacrylic esters having up to 12 carbon atoms in the alcohol moiety, acrylonitrile, methacrylonitrile, acrylamide, methacrylamide, N-vinylpyrrolidone, vinyl acetate, vinyl propionate, vinyl chloride or vinylidene chloride.

The copolymer of A, B and C is preferably used in the form of its ammonium salt, but it is also possible to use for example the alkali metal salts, for example the sodium or potassium salt. It is necessary that the copolymer salts used should be sufficiently water-soluble for the purpose described. The carboxyl groups of the copolymer can also be present in partly neutralized form, in which case, however, at least 30%, preferably 50%, of the carboxyl groups should be in the form of the ammonium or alkali metal salt.

The average molecular weight $M_n$ of the copolymer of A, B and C is in general within the range from 400 to 4000.

Such copolymers are known in principle from EP-A-100 444 (2), where copolymers are described which are prepared by continuous bulk polymerization of a monomer mixture of
A') from 25 to 50% by weight of an α,β-olefinically unsaturated monocarboxylic acid such as acrylic acid or methacrylic acid,
B') from 50 to 75% by weight of an aromatic vinyl compound such as styrene, vinyltoluene or α-methylstyrene, and C') from 0 to 10% by weight of a copolymerizable acrylically unsaturated monomer at from 200° to 400° C. in the absence of free-radical polymerization initiators and regulators. These copolymers are employed as binders for aqueous printing inks for printing paper, plastic film and sheet and metal foil.

The binder in the pigment preparations used according to the invention is normally incorporated into the pigment preparations as a solution. This solution of the binder is preferably a purely aqueous solution. However, the binders used according to the invention can also be used if the solution additionally contains water-miscible organic solvents, for example ethylene glycol or methoxypropanol or mixtures thereof, in an amount of up to 30% by weight, in particular up to 10% by weight, based on the amount of water. The binder solution admixed in the making of the pigment preparations normally has a solids content of from 10 to 50% by weight.

The pigments and delusterants present in the pigment preparations used according to the invention can be organic or inorganic. Suitable organic pigments are for example those of the azo, anthraquinone, azophosphine, thioindigo, dioxazine, naphthalenetetracarboxylic acid and perylenetetracarboxylic acid series, copper-free or copper-containing phthalocyanines and also laked dyes such as calcium, magnesium or aluminum lakes of sulfo- or carboxyl-containing dyes. Suitable inorganic pigments and delusterants are for example titanium dioxides, iron oxides, carbon black, nickel-chromium compounds, silicon dioxides, aluminum oxides, ultramarine and spinels.

The choice of pigment or delusterant for the leather finish is made according to the desired coloring or delustering effect. Inorganic pigments are used for example when high hiding power is desired, while organic pigments are used when transparency is to be combined with high brilliance and color strength. Mixtures of the two classes of pigment are also possible.

Further customary dispersants and other auxiliaries such as wetting agents, antifoams, thickeners, water retention aids, biocides and pH regulators are for example alkoxylated fatty alcohols and oxo process alcohols, alkylphenols, fatty amines, soylecithin, polysaccharides, bentonites and polyphosphates. They are added in the amounts customary in the art.

In a preferred embodiment, the pigment preparations according to the invention additionally contain ammonium salts or alkali metal salts of polyacrylic acids as auxiliaries. Ammonium salts of polyacrylic acids are preferred. These polyacrylates, which chiefly act as wetting and/or thickening agents, are polyacrylic acids having a Fikentscher K value of from 30 to 100, preferably from 50 to 90 (measured on a 1% by weight solution in tetrahydrofuran). The polyacrylate is normally incorporated into the pigment preparations in the form of a solution. This solution is preferably a purely aqueous solution; concerning the inclusion of water-miscible organic solvents the remarks made concerning the solution of the binder apply. Such a polyacrylate solution admixed in the making of the pigment preparations used according to the invention normally has a solids content of from 5 to 25% by weight.

In a further preferred embodiment, the pigment preparations according to the invention additionally contain as auxiliaries reaction products of ethylenediamine with ethylene oxide or reaction products of ethylenediamine with propylene oxide and then with ethylene oxide. Of these, preference is given to the last-mentioned ethylenediamine-propylene oxide-ethylene oxide reaction products. These reaction products are chiefly used as wetting mediators. Their average molecular weight $M_n$ is customarily within the range from 200 to 20 000, preferably within the range from 5000 to 15 000.

The aqueous pigment preparations used according to the invention normally contain, based on the total amount of the preparation:

from 5 to 70% by weight, preferably from 8 to 50% by weight, of pigments or delusterants or a mixture thereof, from 0.1 to 10% by weight, preferably from 0.5 to 5% by weight, of copolymers of A, B and C, from 0.1 to 10% by weight, preferably from 0.1 to 2% by weight, of ammonium or alkali metal salts of polyacrylic acids, from 0.1 to 10% by weight, preferably from 0.5 to 3% by weight, of reaction products of ethylenediamine with ethylene oxide or reaction products of ethylenediamine with propylene oxide and then with ethylene oxide, and also further customary dispersants and auxiliaries in the amounts customary in the art, the percentages always being based on the solids used.

The pigment preparations according to the invention can be produced in a simple manner by dispersing the components in wet-grinding apparatus such as ball mills, stirred ball mills or rotor-stator mills. After the dispersing, the pigments or delusterants have an average particle size of from 0.1 to 2 μm, in particular from 0.1 to 1 μm.

The present invention also provides a process for preparing leather and leather substitutes by treatment with finishes containing admixed pigment preparations according to the invention.

The present invention further provides finishes for leather and leather substitutes containing admixed pigment preparations according to the invention.

The person skilled in the art will be aware of the preparation and possible uses of finishes for leather and leather substitutes, so no details will be given here.

The copolymers of components A, B and C used as binders in the aqueous pigment preparations according to the invention make it possible to prepare stable concentrates of the pigments and delusterants. The finish on the leather is soft and flexible, the grain is not hidden and the leather therefore looks uncoated and finely grained. It is also very elegant in appearance and has a pleasant hand. The finished leather also has high wet-fastness properties, for example wet crock fastness, wet flex fastness and wet adhesion fastness, but the dry crock fastness is also excellent. The leather finishing method of the invention is advantageously useable in particular in the case of waterproofed leather, since the finish does not impair the water repellency of the leather. Of particular advantage is the absence of organic solvents from the pigment preparations used according to the invention.

PREPARATION EXAMPLES FOR PIGMENT PREPARATIONS

General Method of Preparation for Examples 1 to 10

The pigment or the mixture of two pigments, the 35% by weight aqueous solution of a copolymer of 60% by weight of styrene and 40% by weight of acrylic acid in the form of its ammonium salt (a), the 10% by weight aqueous solution of the ammonium salt of a polyacrylic acid having a Fikentscher K value of about 75 (measured on a 1% by weight solution in tetrahydrofuran) (b), the reaction product of 1 part by weight of ethylenediamine with 74.5 parts by weight of propylene oxide and then with 49.5 parts by weight of ethylene oxide, having an average molecular weight $M_n$ of about 7500, ($c^1$) or the reaction product of 1 part by weight of ethylenediamine with 124.5 parts by weight of propylene oxide and then with 83 parts by weight of ethylene oxide, having an average molecular weight $M_n$ of about 12500, ($c^2$) and also further customary dispersants and auxiliaries (d) were suspended in water (e). This suspension was dispersed with the aid of a stirred ball mill. After the dispersing, the average particle size of the pigments was in each case within the range from 0.1 to 0.5 μm.

The table below shows details of the resulting pigment preparations.

TABLE

| Ex. no. | Pigment type* | Amount [g] | Solution (a) Amount [g] | Solution (b) Amount [g] | Product ($c^1/c^2$) Amount [g] | further dispersants and auxiliaries (d) Type | Amount [g] | Water (e) Amount [g] |
|---|---|---|---|---|---|---|---|---|
| 1 | C.I. Pigment Blue 15:1 (phthalocyanine) | 563** | 70 | 100 | 20 ($c^1$) | customary biocide, customary antifoam | 20  2 | 1285 |
| 2 | C.I. Pigment Red 101 (red iron oxide) | 1600 | 200 | 200 | 40 ($c^1$) | soy-lecithin, customary biocide, customary thickener | 40  8  40 | 1872 |
| 3 | C.I. Pigment White 6 (titanium dioxide) | 2500 | 200 | 150 | 50 ($c^1$) | soy-lecithin, customary biocide, customary antifoam | 50  50  5 | 1995 |
| 4 | C.I. Pigment Yellow 34 (chromium yellow) | 1720 | 400 | 200 | 40 ($c^2$) | soy-lecithin, customary biocide, sodium polyphosphate | 20  40  10 | 1570 |
| 5 | C.I. Pigment Yellow 42 (precipitated iron oxide) | 1400 | 200 | 200 | 40 ($c^1$) | soy-lecithin, customary biocide | 80  40 | 2040 |
| 6 | C.I. Pigment Red 104 (chromium molybdate) C.I. Pigment Yellow 34 (chromium yellow) | 78  32 | 16 | 10 | 4 ($c^1$) | customary biocide | 4 | 256 |
| 7 | C.I. Pigment Red 123 (perylene-tetracarboxylic acid derivative) | 160 | 50 | 100 | 20 ($c^1$) | customary biocide | 20 | 1650 |
| 8 | C.I. Pigment Black 7 (carbon black) | 1000 | 350 | 250 | 50 ($c^1$) | customary biocide | 50 | 3300 |
| 9 | C.I. Pigment Yellow 81 (azo pigment) | 30 | 10 | 5 | 2 ($c^2$) | customary biocide | 2 | 151 |
| 10 | C.I. Pigment Black 7 (carbon black) | 100 | 50 | 30 | 10 ($c^1$) | customary biocide, customary antifoam | 10  2 | 798 |

*pigment names as per Colour Index (C.I.)
**in the form of a 32% by weight aqueous press cake

USE EXAMPLES FOR LEATHER FINISHING

Example 11

Buffed White Cattlehide Leather for Shoes

The bottoming mix used was a mixture of 150 g of the pigment preparation of Example 3, 300 g of a here customary copolymer dispersion as per Example 4 of EP-B-100 493, 100 g of a here customary copolymer dispersion as per Example 1a4 of EP-B-100 493, 50 g of an aqueous montan wax emulsion (solids content about 30% by weight) and 400 g of water. The leather was plush-padded once with this bottoming mix, dried at 70° C., plated at 70° C., plush-padded once more and with intermediate drying at 70° C. each time sprayed twice with the bottoming mix from an air gun. The bottoming mix add-on was about 80 g of solids per m² of leather surface.

The bottomed leather was then seasoned with a mixture of 465 g of a here customary copolymer dispersion as per Example 7 of EP-B-100 493, 15 g of a wax emulsion based on silicone, 20 g of the pigment preparation of Example 3 and 500 g of water. This seasoning mix was applied in a single spraying with the air gun, the add-on being about 15 g of solids per m² of leather surface. The leather was then dried at 70° C. and plated at 80° C.

The purely aqueously finished leather thus obtained had all the properties desired for shoe uppers. The wet crock fastness, measured as per DIN 53 339 (IUF 450), was 70 crock cycles.

Comparative Examples 11A to 11C

Example 11 was repeated using instead of the pigment preparation of Example 3 according to the invention corresponding pigment preparations containing as binder casein (Example 11A), a customary copolymer of styrene and maleic acid (Example 11B) or an acrylatemethacrylate-vinylpyrrolidone-acrylic acid-vinyl acetate polymer as per (1) (Example 11C).

The wet crock fastness properties of the leathers thus obtained, measured in accordance with DIN 53 339 (IUF 450), were in all three cases distinctly lower than in the case of the finish according to the invention, namely 40 crock cycles in the case of Example 11A and 30 crock cycles each in the case of Example 11B and in the case of Example 11C. An improvement in the wet crock fastness properties was obtainable only by spraying on an additional coat of the seasoning mix. However, this thicker coat of seasoning robbed the finish of its elegance: the leather had a less natural look and feel.

Example 12: Black nappa cattlehide leather for car seats.

The bottoming mix used was a mixture of 100 g of the pigment preparation of Example 10, 300 g of a here customary copolymer dispersion as per Example 1a1 of EP-B-100 493, 50 g of an aqueous montan wax emulsion (solids content about 30% by weight), 50 g of an aqueous silica dispersion (solids content about 13% by weight), 100 g of an aqueous dispersion of an aliphatic polyesterurethane (film hardness Shore A-45, solids content about 40% by weight) and 400 g of water. This bottoming mix was applied to the black leather from a compressed air spraygun in 4 coats. The leather was dried at 70° C. after each coat and plated at 80° C. after the second coat. The bottoming mix add-on was about 65 g of solids per m² of leather surface.

The bottomed leather was then seasoned with a mixture of 350 g of a silica-delustered polymer dispersion based on methyl methacrylate, ethyl acrylate and acrylic acid (solids content about 20% by weight), 100 g of an aqueous dispersion of an aliphatic polyesterurethane (film hardness Shore A-95, solids content about 30% by weight), 15 g of a customary aqueous polyurethane thickener (solids content about 25% by weight), 35 g of a customary isocyanate crosslinker based on trimerized hexamethylene diisocyanate in aqueous emulsion (solids content about 50% by weight, NCO content 9%), 20 g of the pigment preparation of Example 10 and 400 g of water. This seasoning mix was applied by means of the spraygun in two coats with intermediate and final drying in each case at 70° C., the add-on being about 15 g of solids per m² of leather surface.

The purely aqueously finished leather thus obtained had a wet crock fastness, measured as per DIN 53 339 (IUF 450), of 600 crock cycles. The test was carried out after the finished leather had been stored for 1 week, since the finish was of the crosslinked type.

Comparative Examples 12A to 12C

Example 12 was repeated using instead of the pigment preparation of Example 10 according to the invention corresponding pigment preparations containing as binder casein (Example 12A), a customary copolymer of styrene and maleic acid (Example 12B) or an acrylatemethacrylate-vinylpyrrolidone-acrylic acid-vinyl acetate polymer as per (1) (Example 12C).

The wet crock fastness properties of the leathers thus obtained, determined in accordance with DIN 53 339 (IUF 450), were in all three cases distinctly lower than in the case of the finish according to the invention, namely 250 crock cycles in the case of Example 12A, 350 crock cycles in the case of Example 12B and 200 crock cycles in the case of Example 12C. Example 13: Waterproofed black cattlehide leather for shoes The cattlehide leather, waterproofed with a here customary aqueous polymer dispersion based on a long-chain olefin and maleic acid, was sprayed from a spraygun with a single coat of an adhesive bottoming consisting of 170 g of a here customary polyurethane dispersion as per Example 1, preparation Z3, of DE-A-4 003 422 and 830 g of water, the add-on being about 6 g of solids per m² of leather surface and being dried at 80° C.

Then a finishing base preparation consisting of 100 g of the pigment preparation of Example 8, 150 g of a here customary polyurethane dispersion as per Example 1 of DE-A-2 645 779, 30 g of a here customary poly(butyl acrylate) dispersion (solids content about 50% by weight), 50 g of a here customary copolymer dispersion as per Example 1a4 of EP-B-100 493 and 700 g of water was applied by means of a spraygun in two coats, and the leather was dried at 70° C., plated in a hydraulic press at 70° C. and 50 bar, then sprayed two further times with the finishing base preparation and dried at 70° C. The total add-on was about 50 g of solids per m² of leather surface.

Then the leather was seasoned with a here customary mix consisting of 100 g of a nitrocellulose lacquer emulsion (solids content 13% by weight) and 50 g of water by spraygun application of two coats with intermediate drying at 70° C., the add-on being about 9 g of solids per m² of leather surface and being dried at 70° C.

The finished waterproofed leather thus obtained had a wet crock fastness of 550 crock cycles. The waterproofness as defined in DIN 53 338 (measured in the penetrometer at 15% compression) was likewise adequate after finishing: no water had penetrated even 6 hours later.

Comparative Examples 13A to 13C

Example 13 was repeated replacing the pigment preparation of Example 8 according to the invention with corresponding pigment preparations containing as binder casein (Example 13A), a customary copolymer of styrene and maleic acid (Example 13B) or an acrylatemethacrylate-vinylpyrrolidone-acrylic acid-vinyl acetate polymer as per (1) (Example 13C).

The wet crock fastness properties of the leathers thus obtained were in all three cases distinctly lower than in Example 13, namely 300 crock cycles in the case of Example 13A, 120 crock cycles in the case of Example 13B and 140 crock cycles in the case of Example 13C. Similarly, the waterproofness in Examples 13A to 13C was distinctly worse than in Example 13, water penetration taking place significantly earlier, namely after 4.5 hours in the case of Example 13A, after 2 hours in the case of Example 13B and after 2.5 hours in the case of Example 13C.

We claim:

1. A pigment preparation, consisting essentially of at least one pigment or delusterant or a mixture thereof, a binder and water, the binder, comprising:

A) from about 55 to 65% by weight of at least one aromatic vinyl compound of the formula (I):

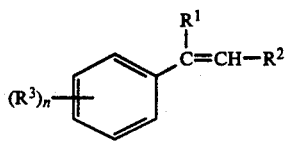

wherein $R^1$, $R^2$ and $R^3$ are each hydrogen, methyl or ethyl and n is 1 or 2, and B) from about 35 to 45% by weight of acrylic acid in the form of an ammonium salt.

2. The pigment preparation of claim 1, which further comprises up to about 10% by weight of one or more additional copolymerizable monomers.

3. The pigment preparation of claim 1, wherein the pigment preparation further contains an ammonium salt or an alkali metal salt of one or more polyacrylic acids.

4. The pigment preparation of claim 1, which further contains reaction products of ethylenediamine with ethylene oxide or reaction products of ethylenediamine with ethylene oxide, and then with ethylene oxide.

5. The pigment preparation of claim 1, which comprises about 60% by weight of component A and about 40% by weight of component B.

6. The pigment preparation of claim 1, wherein $R^1$ is hydrogen or methyl, $R^2$ and $R^3$ are each hydrogen and n is 1.

7. The pigment preparation of claim 1, wherein said component A is selected from the group consisting of styrene, α-methylstyrene and a mixture thereof.

8. The pigment preparation of claim 2, wherein said one or more additional copolymerizable monomers are contained in the amount of up to about 5% by weight.

9. The pigment preparation of claim 8, wherein said one or more additional copolymerizable monomers are contained in the amount of up to about 2% by weight.

10. The pigment preparation of claim 2, wherein said one or more copolymerizable monomers are selected from the group consisting of acrylic and methacrylic esters having up to 12 carbon atoms in the alcohol moiety, acrylonitrile, methacrylonitrile, acrylamide, methacrylamide, N-vinylpyrrolidone, vinyl acetate, vinyl propionate, vinyl chloride and vinylidene chloride.

11. The pigment preparation of claim 1, wherein said pigment is an organic pigment selected from the group consisting of azo, anthraquinone, azophosphine, thioindigo, dioxazine, naphthalenetetracarboxylic acid series, perylenetetracarboxylic acid series, copper-free and copper-containing phthalocyanines and laked dye pigments.

12. The pigment preparation of claim 1, wherein said pigment is an inorganic pigment selected from the group consisting of titanium dioxide, iron oxide, carbon black, nickel-chromium compound, silicon dioxide, aluminum oxide, ultramarine and spinel pigments.

13. A process for preparing a finish for leather and leather substitutes, which comprises admixing the pigment preparation of claim 1.

14. A process for preparing treated leather and leather substitutes, which comprises treating leather and leather substitutes with a finish containing the pigment preparation of claim 1.

15. A finish for leather and leather substitutes, which comprises the pigment preparation of claim 1.

* * * * *